(12) United States Patent
Rothberg

(10) Patent No.: US 6,735,650 B1
(45) Date of Patent: May 11, 2004

(54) DISK DRIVE AND METHOD FOR DATA TRANSFER INITIATED BY NONSTANDARD DISK-DRIVE COMMANDS ON A SERIAL ATA INTERFACE THAT ONLY SUPPORTS STANDARD ATA DISK-DRIVE COMMANDS

(75) Inventor: Michael S. Rothberg, Foothill Ranch, CA (US)

(73) Assignee: Western Digital Technologies, Inc., Lake Forest, CA (US)

(*) Notice: Subject to any disclaimer, the term of this patent is extended or adjusted under 35 U.S.C. 154(b) by 137 days.

(21) Appl. No.: 10/232,638

(22) Filed: Aug. 30, 2002

(51) Int. Cl.[7] .................... G06F 13/00; G06F 13/14
(52) U.S. Cl. .................... 710/74; 710/5; 710/8; 710/65; 711/154; 711/156
(58) Field of Search .................... 710/8, 5, 33, 65, 710/74; 711/100, 154, 156

(56) References Cited

U.S. PATENT DOCUMENTS

| | | | | |
|---|---|---|---|---|
| 5,530,960 A | * | 6/1996 | Parks et al. .................... | 710/5 |
| 5,905,885 A | * | 5/1999 | Richter et al. ................ | 710/5 |
| 6,421,760 B1 | * | 7/2002 | McDonald et al. ......... | 711/114 |
| 6,496,900 B1 | * | 12/2002 | McDonald et al. ......... | 711/112 |
| 6,549,981 B2 | * | 4/2003 | McDonald et al. ......... | 711/114 |

* cited by examiner

Primary Examiner—Rehana Perveen
(74) Attorney, Agent, or Firm—Milad G. Shara, Esq.; Robroy R. Fawcett, Esq.

(57) ABSTRACT

A disk drive and method are disclosed for data transfer initiated by nonstandard disk-drive commands on a serial ATA interface that only supports standard ATA disk-drive commands. In the method, a nonstandard disk-drive command for data transfer is embedded within a first data block accessible using a first standard disk-drive command. The first standard disk-drive command is transmitted through the serial ATA interface causing the first data block to be transferred from the host computer to the disk control system. The embedded command is extracted from the transferred first data block and provided to the disk control system. A status response is transmitted to the host computer based on the extracted command. At least one additional standard disk-drive command is transmitted through the serial ATA interface to the disk control system for transferring the identified data between the host computer and the disk drive.

38 Claims, 4 Drawing Sheets

| SMART WRITE LOG STANDARD ATA COMMAND ||
|---|---|
| REGISTER | VALUE |
| FEATURES | D6h (write-log subcommand code) |
| SECTOR COUNT | XXh (block count) |
| SECTOR NUMBER | YYh (command port) |
| CYLINDER | C24Fh (SMART command enable code) |
| COMMAND | B0h (SMART op code) |

FIG. 3

| STANDARD KEY SECTOR FORMAT |||
|---|---|---|
| FIELD | BYTE COUNT | DESCRIPTION |
| ACTION CODE | 2 | Code for CMD operation to be performed |
| PARAMETER1 | 2 | Depends on CMD operation |
| PARAMETER2 | 2 | Depends on CMD operation |
| PARAMETER3 | 2 | Depends on CMD operation |
| . | . | . |
| PARAMETER255 | 2 | Depends on CMD operation |

FIG. 4

| SMART READ LOG ATA COMMAND ||
|---|---|
| REGISTER | VALUE |
| FEATURES | D5h (read-log subcommand code) |
| SECTOR COUNT | XXh (block count) |
| SECTOR NUMBER | ZZh (data port) |
| CYLINDER | C24Fh (SMART enable code) |
| COMMAND | B0h (SMART op code) |

FIG. 5

| SMART WRITE LOG ATA COMMAND ||
|---|---|
| REGISTER | VALUE |
| FEATURES | D6h (write-log subcommand code) |
| SECTOR COUNT | XXh (block count) |
| SECTOR NUMBER | ZZh (data port) |
| CYLINDER | C24Fh (SMART enable code) |
| COMMAND | B0h (SMART op code) |

FIG. 6

DISK DRIVE AND METHOD FOR DATA TRANSFER INITIATED BY NONSTANDARD DISK-DRIVE COMMANDS ON A SERIAL ATA INTERFACE THAT ONLY SUPPORTS STANDARD ATA DISK-DRIVE COMMANDS

BACKGROUND OF THE INVENTION

1. Field of the Invention

The present invention relates to a disk drive command interface, and more particularly, to a disk drive for implementing data transfer initiated by nonstandard disk-drive commands on a serial ATA interface that only supports standard ATA disk-drive commands.

2. Description of the Prior Art

A standard parallel ATA interface uses a 40-pin connector and a bulky flat ribbon cable that is becoming unable to accommodate further growth in the data transfer capacity of the interface. A serial ATA interface is emerging that can accommodate growth in data transfer capacity and that uses a significantly smaller 7 conductor connector. The connector includes a receive differential pair of conductors and a transmit differential pair of conductors. The remaining three conductors are ground connections. The serial ATA interface does not provide for nonstandard (or vendor specific) disk-drive commands. Typically, nonstandard disk-drive commands are used primarily during disk-drive manufacture and quality testing. Providing a separate nonstandard disk-drive command interface would add to the cost of the disk drive.

Accordingly, there exists a need for a disk drive that implements data transfer initiated by nonstandard disk-drive commands on a serial ATA interface that only supports standard ATA disk-drive commands. The present invention satisfies theses needs.

SUMMARY OF THE INVENTION

The present invention may be embodied in a disk drive connectable to a host computer, and responsive to standard disk-drive commands associated with disk-drive operations and to nonstandard disk-drive commands required for disk drive manufacture and quality testing. The disk drive includes a disk, a head actuated radially over the disk, a disk control system, a serial ATA interface, and means for extracting a nonstandard disk-drive command for disk-drive data transfer. The disk control system responds to disk-drive commands and accesses data storage locations on the disk through the head. The serial ATA interface couples the disk control system to the host computer when the disk drive is connected to the host computer. The serial ATA interface is configured to transfer standard disk-drive commands from the host computer to the disk control system and is configured to not transfer nonstandard disk-drive commands from the host computer to the disk control system. The extracting means extracts a nonstandard disk-drive command for data transfer that is embedded within a first data block accessed using a standard disk-drive command. The nonstandard disk-drive command identifies the disk data for transfer. The disk drive further includes means for providing the extracted nonstandard disk-drive command to the disk control system, means for transmitting a status response, based on the extracted nonstandard disk-drive command for data transfer, from the disk drive to the host computer, and means for transmitting at least one additional standard disk-drive command, responsive to the status response, from the host computer through the serial ATA interface to the disk control system for transferring the identified data between the host computer and the disk drive.

In more detailed feature of the invention, the disk drive may further include buffer memory, flash memory, and/or a reserve area of the disk, for storing the identified data. The reserve area of the disk may be accessed using negative cylinder numbers or using negative logical block address numbers.

In more detailed feature of the invention, the nonstandard disk-drive command may include a code for defining a disk-drive data write operation in which the identified data is transferred from the host computer to the disk drive, or may include a code for defining a disk-drive data read operation in which the identified data is transferred from the disk drive to the host computer. The identified data may include at least one disk drive performance value or physical parameter of the disk drive. The first data block may include a logical block address, and the identified data may include a translation of the logical block address to a cylinder, head, sector address. Conversely, the first data block may include a cylinder, head, sector address, and the identified data may include a translation of the cylinder, head, sector address to a logical block address. Also, the first data block may include parameters defining a start data sector, or a start logical block address, and a sector count, the status response may include a sector count confirmation. At least one additional standard disk drive command may include the sector count. The first data block may include a file identification, and the identified data may comprise a disk-drive file. The first data block may include a wedge identification and a wedge count, and the identified data may comprise at least one data wedge on the disk.

In additional more detailed features of the invention, the disk control system may include a microprocessor and a memory having a microprocessor addressable range of memory addresses. The first data block may include a start memory address and a memory address count. The identified data may be stored in the memory beginning at the start memory address.

The present invention also may be embodied in a method for transferring disk-drive data between the disk drive and the host computer. In the method, a nonstandard disk-drive command for data transfer is embedded within a first data block accessible using a first standard disk-drive command. The nonstandard command identifies the disk-drive data for transfer. The first standard disk-drive command is transmitted from the host computer through the serial ATA interface to the disk control system. The standard disk-drive command causes the first data block to be transferred from the host computer to the disk control system. The embedded nonstandard disk-drive command for data transfer is extracted from the transferred first data block and provided to the disk control system. A status response is transmitted from the disk drive to the host computer based on the extracted nonstandard disk-drive command for data transfer. At least one additional standard disk-drive command, responsive to the status response, is transmitted from the host computer through the serial ATA interface to the disk control system for transferring the identified data between the host computer and the disk drive.

BRIEF DESCRIPTION OF THE DRAWINGS

The accompanying drawings illustrate embodiments of the present invention and, together with the description, serve to explain the principles of the invention.

FIG. 3 shows a disk-drive command format for embedding a nonstandard disk-drive command, for data transfer, in a data block.

FIG. 4 shows a data block format for embedding a nonstandard disk-drive command for data transfer.

FIG. 5 shows a SMART read-log ATA command for reading disk-drive data identified by the nonstandard disk-drive command embedded in the data block of FIG. 4.

FIG. 6 shows a SMART write-log ATA command for writing disk-drive data identified by the nonstandard disk-drive command embedded in the data block of FIG. 4.

DETAILED DESCRIPTION

Figure 1:
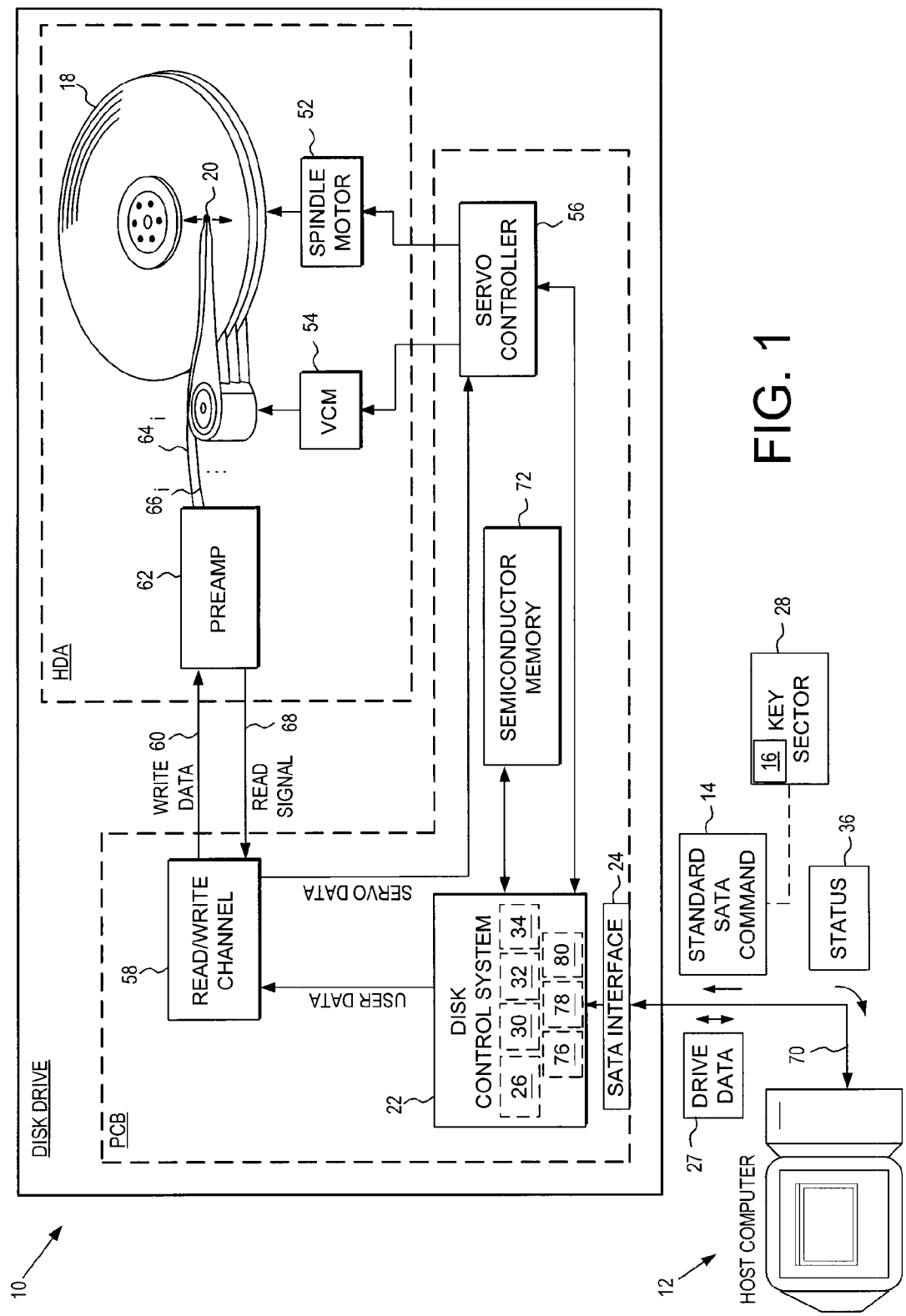
FIG. 1 is a block diagram of a disk drive for implementing data transfer initiated by nonstandard disk-drive commands on a serial ATA interface that only supports standard ATA disk-drive commands, according to the present invention.
}

With reference to FIG. 1, the invention may be embodied in a disk drive 10 connectable to a host computer 12, and responsive to standard disk-drive commands 14 associated with disk-drive operations and to nonstandard disk-drive commands 16 required for disk drive manufacture and quality testing. The disk drive includes a disk 18, a head 20 actuated radially over the disk, a disk control system 22, a serial ATA (SATA) interface 24, and means 26 for extracting a nonstandard disk-drive command for disk-drive data 27 transfer. The disk control system responds to disk-drive commands and accesses data storage locations on the disk through the head. The serial ATA interface couples the disk control system to the host computer when the disk drive is connected to the host computer. The serial ATA interface is configured to transfer standard disk-drive commands from the host computer to the disk control system and is configured to not transfer nonstandard disk-drive commands from the host computer to the disk control system. The extracting means extracts a nonstandard disk-drive command for data transfer that is embedded within a first data block 28 accessed using a first standard disk-drive command 14-1, and provides the extracted nonstandard disk-drive command to the disk control system. The extracted nonstandard disk-drive command identifies the disk-drive data 27 for transfer. The disk drive further includes means 30 for providing the extracted nonstandard disk-drive command to the disk control system, means 32 for transmitting a status response 36, based on the extracted nonstandard disk-drive command for data transfer, from the disk drive to the host computer, and means 34 for responding at least one additional standard disk-drive command, responsive to the status response, transmitted from the host computer through the serial ATA interface to the disk control system for transferring the identified data between the host computer and the disk drive.

Figure 2:
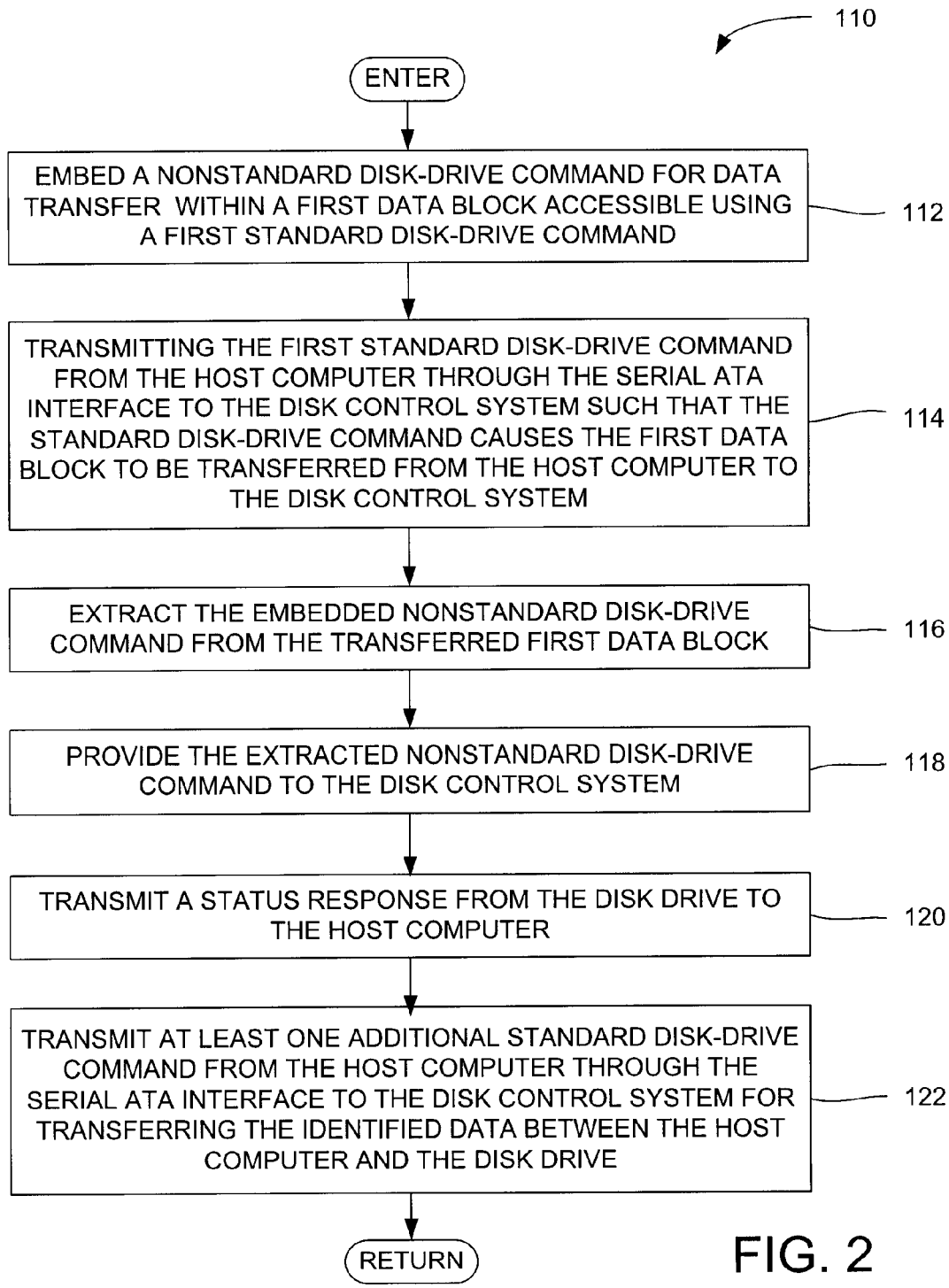
FIG. 2 is a flow chart illustrating a method for implementing data transfer initiated by nonstandard disk-drive commands on a serial ATA interface that only supports standard ATA disk-drive commands, according to the present invention.

With reference to FIG. 2, the invention may be embodied in a related method 110 for transferring disk-drive data 27 between the disk drive 10 and the host computer 12. In the method, a nonstandard disk-drive command 16 for data transfer is embedded within a first data block 28 accessible using a first standard disk-drive command 14-1 (step 112). The nonstandard disk-drive command identifies the disk-drive data for transfer. The first standard disk-drive command is transmitted from the host computer 12 through the serial ATA interface 24 to the disk control system 22 such that the first standard disk-drive command causes the first data block to be transferred from the host computer to the disk control system (step 114). The nonstandard disk-drive command that is embedded within the transferred first data block is extracted (step 116) and provided to the disk control system (step 118). A status response 36 is transmitted from the disk drive to the host computer based on the extracted nonstandard disk-drive command for data transfer (step 120). At least one additional standard disk-drive command 14-N, responsive to the status response, is transmitted from the host computer through the serial ATA interface to the disk control system for transferring the identified data between the host computer and the disk drive (step 122).

With reference to FIGS. 3 and 4, the standard disk drive command 14 may be a Self Monitoring Analysis and Reporting Technology (SMART) write-log command 37 that instructs the disk control system 22 to receive the data block 28. The SMART write-log command is within the SATA command set. The use of SMART commands to configure a disk drive 10 are described in more detail in U.S. patent application Ser. No. 10/004,231, filed Oct. 31, 2001, and titled DISK DRIVE FOR RECEIVING SETUP DATA IN A SELF MONITORING ANALYSIS AND REPORTING TECHNOLOGY (SMART) COMMAND, which application is incorporated herein by reference. Techniques for enabling and disabling a disk drive's use of the nonstandard disk drive commands 16 are described in U.S. patent application Ser. No. 10/183,207, filed Jun. 26, 2002, and titled DISK DRIVE AND METHOD FOR IMPLEMENTING NONSTANDARD DISK-DRIVE COMMANDS ON A SERIAL ATA INTERFACE THAN ONLY SUPPORTS STANDARD ATA DISK-DRIVE COMMANDS, which application is incorporated herein by reference.

The first data block 28 may be a key sector 38 (FIG. 4) having 512 data bytes. The data block may include a two-byte action code field 40, and may further include at least one two-byte parameter field 42. The action code and parameter fields provide the mechanism for transferring the nonstandard disk-drive commands 16 from the host computer 12, through the SATA interface 24, and to the disk control system 22. Examples of nonstandard disk-drive commands for data transfer may include: READ\WRITE LBA SEGMENT, READ\WRITE RESIDENT FILE, READ\WRITE CHS SEGMENT, READ\WRITE MEMORY LOCATION, READ\WRITE BUFFER, READ\RESET ERROR TABLE, WRITE WEDGE(S), GET DRIVE DATA TABLE, etc. Each command is assigned a unique action code, and appropriate parameters are defined. A disk-drive manufacturer may implement a wide variety of nonstandard disk-drive or "native" commands for the manufacture and quality testing of the disk drive. Because the nonstandard disk-drive commands are embedded in the key sector 32, the commands may be transmitted to the disk drive over the SATA interface, avoiding the need for a separate specific command interface.

The nonstandard disk-drive command 16 may include a code 40 for defining a disk-drive data write operation in which the identified data 27 is transferred from the host computer 12 to the disk drive 10, or for defining a disk-drive data read operation in which the identified data is transferred from the disk drive to the host computer. The first data block 28 may include parameters defining a start data sector, or a start logical block address, and a sector count, the status response 36 may include a sector count confirmation. At least one additional standard disk drive command 14-N may include the sector count. The first data block may include a file identification, and the identified data may comprises a disk-drive file. The first data block may include a wedge identification and a wedge count, and the identified data may comprise at least one data wedge on the disk 18. The first data block may include a start memory address and a memory address count. The identified data may be stored in a memory beginning at the start memory address. The disk drive may further include a reserve area of the disk, for storing the identified data. The reserve area of the disk may be accessed using negative cylinder numbers or using negative logical block address (LBA) numbers.

Further, the first data block 28 may include a logical block address, and the identified data 27 may include a translation of the logical block address to a cylinder, head, sector (CHS) address. Conversely, the first data block may include a cylinder, head, sector address, and the identified data may include a translation of the cylinder, head, sector address to a logical block address.

The identified data 27 may include at least one disk drive performance value or physical parameter of the disk drive 10. The disk-drive performance value may include error rate, etc. The physical parameter may include head count, number of user cylinders, number of negative cylinders, number of servo zones, number of servo wedges on a track, nominal spindle rotation rate, etc.

With reference to FIGS. 5 and 6, the additional standard disk-drive command 14-N may include a SMART READ LOG ATA COMMAND 44, or a SMART WRITE LOG ATA COMMAND 46.

The disk drive 10 of FIG. 1 further comprises a spindle motor 52 for rotating the disk 18 and a voice coil motor (VCM) 54 for actuating the head 20 radially over the disk 18. A servo controller 56 generates the appropriate control signals applied to the spindle motor 52 and VCM 54 in response to commands received from the disk controller 22. During a write operation the disk controller 22 transmits user data received from the host computer 12 to a read/write channel 58. The read/write channel 58 performs appropriate encoding of the user data to generate write data 60 written to the disk 18. The write data 60 modulates the operation of a preamp 62 to generate a write signal $64_i$ applied to the head 20 in order to write magnetic transitions onto the surface of the disk 18. During a read operation, the head 20 detects the magnetic transitions representing the recorded data to generate a read signal $66_i$ which is amplified by the preamp 62 to generate a read signal 68 applied to the read/write channel 58. The read/write channel 58 demodulates the read signal 68 into user data transmitted to the host computer 12 via the disk controller 22 after correcting errors.

The disk drive 10 communicates with the host computer 12 over a SATA cable 70 using a communication protocol referred to as the IDE protocol. The IDE protocol includes a definition of the industry standard ATA command set. The host computer's operating system may comprises a low level "port" driver which communicates with the disk drive 10 through a data structure. There are only a limited number of IDE commands supported by disk drive manufacturers as well as some operating systems. The standard IDE protocol may provide no support for modifying the configuration parameters of a disk drive by a computer program running under some operating systems. However, the standard IDE protocol does provide support for the SMART command set which allows a computer program running under such an operating system to configure a disk drive so that it will accumulate and report diagnostic information. Thus, the host computer can evaluate the health of the disk drive and report impending failures to the user so that remedial measures can be taken before data is lost.

The disk 18, spindle motor 52, VCM 54, preamp 62, and related hardware may be integrated into a head-disk assembly (HDA). The disk control system 22, SATA interface 24, semiconductor memory 72, servo controller 56, read/write channel 58, and related electronics may be mounted on a printed circuit board (PCB). The disk control system 22 generally includes circuitry and processors that control the HDA and that provide an intelligent control interface between the host computer 12 and the HDA for execution of disk-drive commands. The disk control system may have an internal microprocessor 76, buffer memory 78 and nonvolatile memory 80, for implementing the techniques of the invention. The semiconductor memory may have nonvolatile memory and volatile random access memory (RAM) The semiconductor memory has a microprocessor addressable range of memory addresses. Program code for implementing the components and techniques of the invention, such as the extracting means 26, providing means 30, status response means 32, and responding mean 34, may be stored in the nonvolatile memory and transferred to the RAM for execution by the microprocessor.

I claim:

1. In a disk drive connected to a host computer, and responsive to standard disk-drive commands associated with disk-drive operations and to nonstandard disk-drive commands required for disk-drive manufacture and quality testing, the disk drive including a disk, a head actuated radially over the disk, a disk control system for responding to disk-drive commands and for accessing data storage locations on the disk through the head, and a serial ATA interface for coupling the disk control system to the host computer when the disk drive is connected to the host computer, wherein the serial ATA interface is configured to transfer standard disk-drive commands from the host computer to the disk control system and is configured to not transfer nonstandard disk-drive commands from the host computer to the disk control system, a method for transferring disk-drive data between the disk drive and the host computer, comprising:

embedding a nonstandard disk-drive command for data transfer within a first data block accessible using a first standard disk-drive command, the nonstandard disk-drive command identifying the disk-drive data for transfer;

transmitting the first standard disk-drive command from the host computer through the serial ATA interface to the disk control system, wherein the first standard disk-drive command causes the first data block to be transferred from the host computer to the disk control system;

extracting the embedded nonstandard disk-drive command for data transfer from the transferred first data block;

providing the extracted nonstandard disk-drive command for data transfer to the disk control system;

transmitting a status response, based on the extracted nonstandard disk-drive command for data transfer, from the disk drive to the host computer;

transmitting at least one additional standard disk-drive command, responsive to the status response, from the host computer through the serial ATA interface to the disk control system for transferring the identified data between the host computer and the disk drive.

2. A method for transferring disk-drive data as defined in claim 1, wherein the disk drive further comprises buffer memory for storing the identified data.

3. A method for transferring disk-drive data as defined in claim 1, wherein the disk drive further comprises a reserve area of the disk for storing the identified data.

4. A disk drive as defined in claim 1, wherein
the nonstandard disk-drive commands comprise a first command subset and a second command subset;
the first command subset includes a command to enable response to the second command subset; and
the disk control system is responsive to an extracted nonstandard disk-drive command from the second command subset only after the enable command is received by the disk drive from the host computer.

5. A method for transferring disk-drive data as defined in claim 3, wherein the reserve area of the disk is accessed using negative logical block address numbers.

6. A method for transferring disk-drive data as defined in claim 1, wherein the disk drive further comprises flash memory for storing the identified data.

7. A method for transferring disk-drive data as defined in claim 1, wherein the nonstandard disk-drive command includes a code for defining a disk-drive data write operation in which the identified data is transferred from the host computer to the disk drive.

8. A method for transferring disk-drive data as defined in claim 1, wherein the nonstandard disk-drive command includes a code for defining a disk-drive data read operation in which the identified data is transferred from the disk drive to the host computer.

9. A method for transferring disk-drive data as defined in claim 8, wherein the identified data includes at least one physical parameter of the disk drive.

10. A method for transferring disk-drive data as defined in claim 8, wherein the identified data includes at least one disk-drive performance value.

11. A method for transferring disk-drive data as defined in claim 8, wherein the first data block includes a logical block address, and the identified data includes a translation of the logical block address to a cylinder, head, sector address.

12. A method for transferring disk-drive data as defined in claim 8, wherein the first data block includes a cylinder, head, sector address, and the identified data includes a translation of the cylinder, head, sector address to a logical block address.

13. A method for transferring disk-drive data as defined in claim 1, wherein the first data block includes parameters defining a start data sector and a sector count.

14. A method for transferring disk-drive data as defined in claim 1, wherein the status response includes a sector count confirmation.

15. A method for transferring disk-drive data as defined in claim 14, wherein at least one additional standard disk drive command includes a sector count.

16. A method for transferring disk-drive data as defined in claim 1, wherein the first data block includes a file identification, and the identified data comprises a disk-drive file.

17. A method for transferring disk-drive data as defined in claim 1, wherein the first data block includes a wedge identification and a wedge count, and the identified data comprises at least one data wedge on the disk.

18. A method for transferring disk-drive data as defined in claim 1, wherein the disk control system includes a microprocessor and a memory having a microprocessor addressable range of memory addresses, the first data block includes a start memory address and a memory address count, and the identified data is stored in the memory beginning at the start memory address.

19. A method for transferring disk-drive data as defined in claim 1, wherein the first data block includes parameters defining a start logical block address and a sector count.

20. A disk drive connectable to a host computer, comprising;
a disk;
a head actuated radially over the disk;
a disk control system for responding to the standard and nonstandard disk-drive commands and for accessing data storage locations on the disk through the head;
a serial ATA interface for coupling the disk control system to the host computer when the disk drive is connected to the host computer, wherein the serial ATA interface is configured to transfer standard disk-drive commands from the host computer to the disk control system and is configured to not transfer nonstandard disk-drive commands from the host computer to the disk control system;
means for extracting a nonstandard disk-drive command for data transfer that is embedded within a first data block accessed using a first standard disk-drive command, the nonstandard disk-drive command identifying the disk-drive data for transfer;
means for providing the extracted nonstandard disk-drive command to the disk control system;
means for transmitting a status response, based on the extracted nonstandard disk-drive command for data transfer, from the disk drive to the host computer; and
means for transmitting at least one additional standard disk-drive command, responsive to the status response, from the host computer through the serial ATA interface to the disk control system for transferring the identified data between the host computer and the disk drive.

21. A disk drive as defined in claim 20, further comprising buffer memory for storing the identified data.

22. A disk drive as defined in claim 20, further comprising a reserve area of the disk for storing the identified data.

23. A disk drive as defined in claim 22, wherein the reserve area of the disk is accessed using negative cylinder numbers.

24. A disk drive as defined in claim 22, wherein the reserve area of the disk is accessed using negative logical block address numbers.

25. A disk drive as defined in claim 20, further comprising flash memory for storing the identified data.

26. A disk drive as defined in claim 20, wherein the nonstandard disk-drive command includes a code for defining a disk-drive data write operation in which the identified data is transferred from the host computer to the disk drive.

27. A disk drive as defined in claim 20, wherein the nonstandard disk-drive command includes a code for defining a disk-drive data read operation in which the identified data is transferred from the disk drive to the host computer.

28. A disk drive as defined in claim 27, wherein the identified data includes at least one physical parameter of the disk drive.

29. A disk drive as defined in claim 27, wherein the identified data includes at least one disk-drive performance value.

30. A disk drive as defined in claim 27, wherein the first data block includes a logical block address, and the identified data includes a translation of the logical block address to a cylinder, head, sector address.

31. A disk drive as defined in claim 27, wherein the first data block includes a cylinder, head, sector address, and the identified data includes a translation of the cylinder, head, sector address to a logical block address.

32. A disk drive as defined in claim 20, wherein the first data block includes parameters defining a start data sector and a sector count.

33. A disk drive as defined in claim 20, wherein the status response includes a sector count confirmation.

34. A disk drive as defined in claim 33, wherein at least one additional standard disk drive command includes a sector count.

35. A disk drive as defined in claim 20, wherein the first data block includes a file identification, and the identified data comprises a disk-drive file.

36. A disk drive as defined in claim 20, wherein the first data block includes a wedge identification and a wedge count, and the identified data comprises at least one data wedge on the disk.

37. A disk drive as defined in claim 20, wherein the disk control system includes a microprocessor and a memory having a microprocessor addressable range of memory addresses, the first data block includes a start memory address and a memory address count, and the identified data is stored in the memory beginning at the start memory address.

38. A disk drive as defined in claim 20, wherein the first data block includes parameters defining a start logical block address and a sector count.

* * * * *